United States Patent
Li et al.

(10) Patent No.: US 9,659,196 B2
(45) Date of Patent: May 23, 2017

(54) METHOD, APPARATUS AND SYSTEM FOR VERIFYING DATA

(75) Inventors: Hui Li, Beijing (CN); Dan Yu, Beijing (CN); Yong Yuan, Beijing (CN); Liang Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 219 days.

(21) Appl. No.: 13/876,843

(22) PCT Filed: Sep. 30, 2011

(86) PCT No.: PCT/EP2011/067090
§ 371 (c)(1),
(2), (4) Date: May 22, 2013

(87) PCT Pub. No.: WO2012/042008
PCT Pub. Date: Apr. 5, 2012

(65) Prior Publication Data
US 2013/0234837 A1 Sep. 12, 2013

(30) Foreign Application Priority Data

Sep. 30, 2010 (CN) .......................... 2010 1 0506412

(51) Int. Cl.
*H04Q 5/22* (2006.01)
*G06K 7/10* (2006.01)
*G06K 19/07* (2006.01)

(52) U.S. Cl.
CPC ..... *G06K 7/10009* (2013.01); *G06K 19/0723* (2013.01)

(58) Field of Classification Search
CPC ............. G06K 7/0008; G06K 7/10009; G06K 19/0723

(Continued)

(56) References Cited

U.S. PATENT DOCUMENTS 6,412,086 B1 * 6/2002 Friedman et al. ............ 714/733
7,606,557 B2 * 10/2009 Park et al. .................... 455/410

(Continued)

FOREIGN PATENT DOCUMENTS

CN 1983306 A 6/2007 ............. G06F 12/00
CN 101197006 A 6/2008 ............. G06F 12/06

(Continued)

OTHER PUBLICATIONS

International Search Report and Written Opinion, Application No. PCT/EP2011/067090, 9 pages, Dec. 5, 2011.

*Primary Examiner* — Vernal Brown
(74) *Attorney, Agent, or Firm* — Slayden Grubert Beard PLLC

(57) ABSTRACT

A method for data verification may include: receiving by a radio frequency identification (RFID) tag a write command including data to be written; writing by said RFID tag said data to be written into a local storage; reading by said RFID tag data from said local storage; and carrying out by said RFID tag a data verification according to said data read out. Further, a data verification apparatus may include a receiving module for receiving a write command including data to be written; a writing module for writing said data to be written into a first storage module configured for storing said data to be written; a reading module for reading data from said first storage module; and a verifying module for carrying out verification according to the data read out by said reading module. Such method and apparatus may reduce the time of data verification by an RFID tag.

17 Claims, 4 Drawing Sheets

(58) Field of Classification Search
USPC .................................................... 340/10.51
See application file for complete search history.

(56) References Cited

U.S. PATENT DOCUMENTS

2005/0088285 A1* 4/2005 Jei .............................. 340/10.51
2006/0232411 A1* 10/2006 Torchalski et al. ........ 340/572.1
2010/0080074 A1 4/2010 Ohmaru et al. .............. 365/200

FOREIGN PATENT DOCUMENTS

| JP | 2010108585 A | 5/2010 | ............. G11C 29/04 |
| WO | 01/71658 A1 | 9/2001 | ............... G06K 1/12 |
| WO | 2012/042008 A1 | 4/2012 | ............. G06K 19/07 |

* cited by examiner

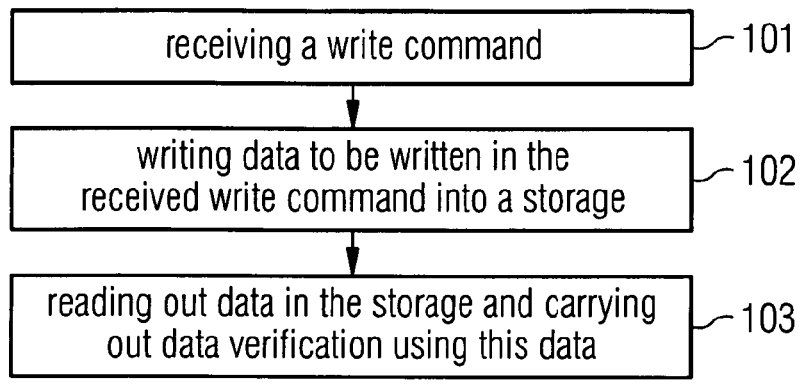
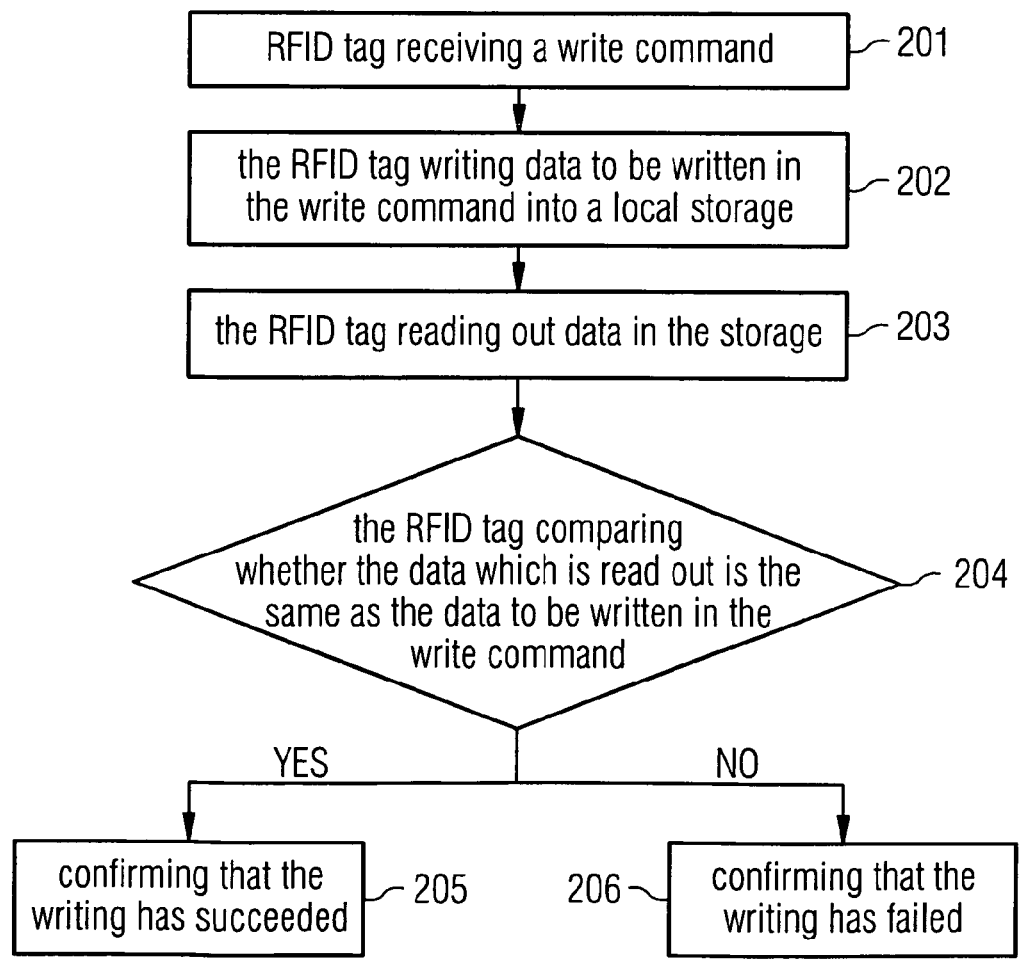

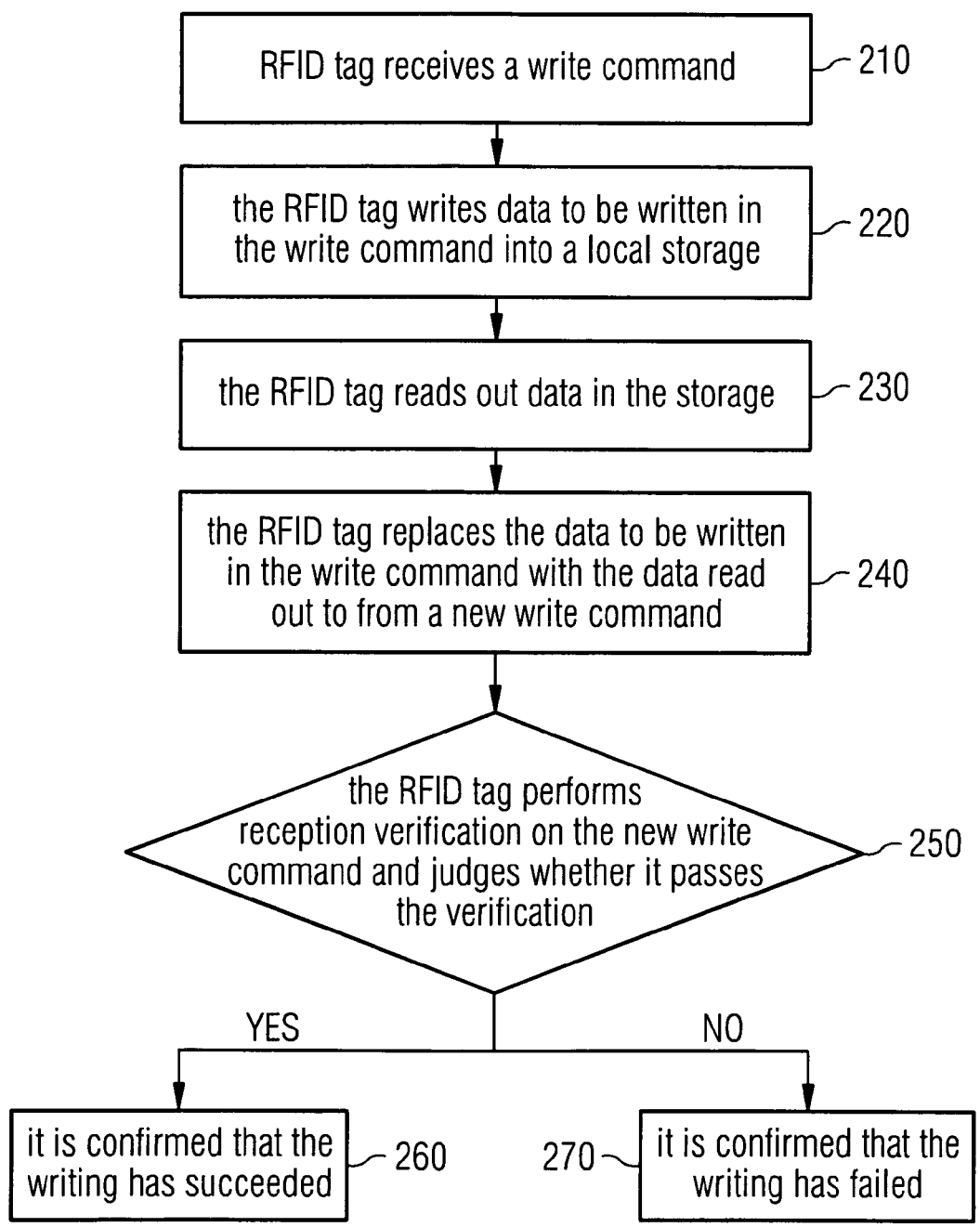

METHOD, APPARATUS AND SYSTEM FOR VERIFYING DATA

CROSS-REFERENCE TO RELATED APPLICATIONS

This application is a U.S. National Stage Application of International Application No. PCT/EP2011/067090 filed Sep. 30, 2011, which designates the United States of America, and claims priority to CN Patent Application No. 201010506412.4 filed Sep. 30, 2010. The contents of which are hereby incorporated by reference in their entirety.

TECHNICAL FIELD

The present disclosure relates to the field of radio frequency identification and, in particular, to data verification technology.

BACKGROUND

Currently, radio frequency identification (RFID) technology is attracting more and more attention. The RFID can identify hundreds of objects per second, therefore it can be applied very widely, particularly in the fields of logistics and manufacturing. In most applications, the protocol efficiency is one of the important measurement criteria for an RFID system's performance.

In order to improve the speed of identification, whether in the single-label mode or multi-label mode, most research has focused on improving the efficiency of the identification process. Since the tags' user storage has become increasingly larger, the efficiency of the process related to the storage seems particularly important. Now, the UHF tags have been able to support a user storage up to 64 K.

In most applications, it is required to ensure the accuracy of the tag data written therein, so that in order to ensure the success of a writing process, data verification is required after a write operation.

At present, after a tag feedbacks that a write command has been carried out successfully, usually all the readers will immediately send a read command, the data which has been written into the tag is read into the reader, and the data verification is carried out by the reader.

However, in some applications which require relatively high efficiency, the processing time of the RFID tags is required to be short, therefore, it is very difficult for the above verification mechanism to meet the requirements of such high efficiency applications.

SUMMARY

One embodiment provides a method for data verification, comprising: receiving, by a radio frequency identification (RFID) tag, a write command, with said write command including data to be written; writing, by said RFID tag, said data to be written into a local storage; reading, by said RFID tag, data from said local storage; and carrying out, by said RFID tag, a data verification according to said data read out thereby.

In a further embodiment, said RFID tag carrying out the data verification according to said data read out thereby comprises: said RFID tag compares said data read out thereby with the data to be written in said write command, and if they are the same, then it is confirmed that the writing has succeeded, otherwise, it is confirmed that the writing has failed.

In a further embodiment, said RFID tag carrying out the data verification according to said data read out thereby comprises: said RFID tag replaces the data to be written in said write command by said data read out thereby, so as to form a new write command; and said RFID tag performs verification of said new write command, and if it passes the verification, then it is confirmed that the writing has succeeded, otherwise, it is confirmed that the writing has failed.

In a further embodiment, said RFID tag carrying out the verification of said new write command comprises: said RFID tag carries out a cyclic redundancy check on said new write command.

In a further embodiment, said method further comprises one or any combination of the following: feeding back, by said RFID tag, a writing failure, when it is confirmed that the writing has failed; feeding back, by said RFID tag, a writing success, when it is confirmed that the writing has succeeded; and writing again, by said RFID tag, the data to be written in said write command into the local storage, when it is confirmed that the writing has failed.

In a further embodiment, the feeding back by said RFID tag of the writing failure comprises: said RFID tag feeds back the writing failure by a reception feedback message, and said reception feedback message is a message for feeding back whether the reception has succeeded.

Another embodiment provides a data verification apparatus, comprising: a receiving module for receiving a write command, with said write command including data to be written; a writing module for writing said data to be written into a first storage module; said first storage module for storing said data to be written; a reading module for reading data from said first storage module; and a verifying module for carrying out verification according to the data read out by said reading module.

In a further embodiment, said verifying module is particularly used for comparing the data read out by said reading module with said data to be written, and if they are the same, then it is confirmed that the writing has succeeded, otherwise, it is confirmed that the writing has failed.

In a further embodiment, said verifying module comprises: a replacing submodule for replacing the data to be written in said write command with the data read out by said reading module, so as to form a new write command; and a reception verifying submodule for carrying out a reception verification on said new write command.

In a further embodiment, said reception verifying submodule is particularly used for carrying out a cyclic redundancy check on said new write command.

Another embodiment provides a radio frequency identification (RFID) tag comprising a data verification apparatus as disclosed above.

Another embodiment provides a data verification system comprising an RFID tag as disclosed above, and a reader used for sending a write command to said RFID tag.

BRIEF DESCRIPTION OF THE DRAWINGS

Exemplary embodiments will be explained in more detail below based on the schematic drawings, wherein:

FIG. 1 is a schematic diagram of the flow procedure of a method for data verification provided by the embodiments of the present invention;

FIG. 2a is a schematic diagram of the flow procedure of a method for data verification provided by the embodiments of the present invention;

FIG. 2b is a schematic diagram of the flow procedure of a method for data verification provided by the embodiments of the present invention;

DETAILED DESCRIPTION

Figure 3A:
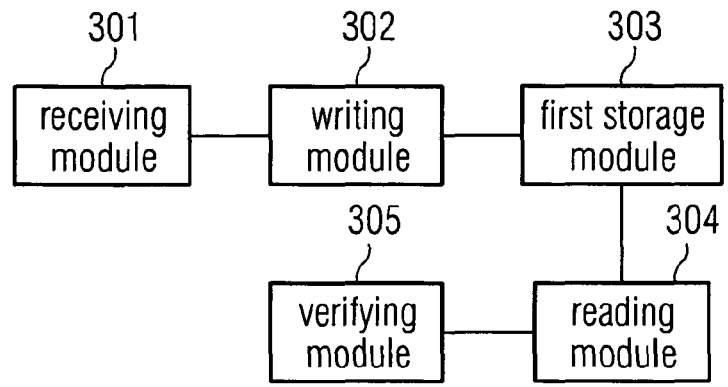
FIG. 3a is a schematic structural diagram of an apparatus for data verification provided by the embodiments of the present invention.

Embodiments of the present disclosure provide a method, apparatus and system for data verification, so as to ensure that the efficiency of the system is improved while performing verification of the data written therein.

For example, some embodiments provide a method for data verification, and said method comprises:
 receiving, by an RFID tag, a write command, with said write command including data to be written;
 writing, by said RFID tag, said data to be written into a local storage;
 reading, by said RFID tag, data from said local storage; and
 carrying out, by said RFID tag, data verification according to said data read out thereby.

The embodiments of the present invention provide an apparatus for data verification, and said apparatus comprises:
 a receiving module for receiving a write command, with said write command including data to be written;
 a writing module for writing said data to be written into a first storage module;
 said first storage module for storing said data to be written;
 a reading module for reading data from said first storage module; and
 a verifying module for carrying out verification according to the data read out by said reading module.

By way of the technical solutions provided by the embodiments of the present invention, the data verification can be carried out by an RFID tag, which can save data transmission time and can avoid reduction of the system efficiency caused by transmission errors, thus achieving the improvement of system efficiency.

The method, apparatus and system for data verification provided by the embodiments of the present invention can be applied, for example, in the field of radio frequency identification, and particularly in radio frequency identification tags.

As shown in FIG. 1, this embodiment of the present invention provides a method for data verification. This method, for example, is carried out by an RFID tag and applied in an RFID system. This method comprises the following steps:

Step 101: receiving a write command.

The write command, for example, is sent by a reader. In this embodiment and the following embodiments, for the sake of simplicity in the description, the reader has at the same time the functions of reading and writing, and during its practical implementation, the reader can be implemented as two separate devices, of which one has the function of reading, and the other has the function of writing.

In this embodiment and the following embodiments, for the sake of simplicity in the description, particular data to be written can also be included in the write command.

Step 102: writing into a storage the data to be written in the received write command.

Usually RFID tags would have certain storage capacity therein, and the data portion contained in a received write command is written into the storage.

Step 103: reading out the data in the storage and carrying out data verification using the data.

In this embodiment, the data in this storage is the data written in step 102. The data in the storage is read out and the data is used to carry out data verification, particularly, there can be a method as shown in FIGS. 2a and 2b, and those skilled in the art can obtain other particular verification methods according to the methods shown in FIGS. 2a and 2b.

In order to save processing time, step 103 can be carried out immediately after the completion of step 102.

By way of the method for data verification provided in this embodiment, the efficiency reduction caused by the transmission of data to be verified when the reader carries out verification can be avoided by carrying out data verification in the RFID tag itself. First of all, since during the data verification, it is not necessary for the data to be transmitted from the RFID tag to the reader, this saves time for data transmission and improves system efficiency. At the same time, the data to be verified may be interfered with by noise from the environment when being transmitted from the RFID tag to the reader, thus transmission errors occur, and such transmission errors will be considered by the reader as errors of data writing, therefore the writing procedure will be started again. Since a writing process consumes a lot of time, re-writing caused by transmission errors would reduce the system efficiency significantly. Particularly in the case of a passive RFID system, the tag information is very weak, so it is prone to interference from noise, therefore the reduction of system efficiency brought about by re-writing caused by such transmission errors would be more serious. Accordingly, the improvement of system efficiency in passive RFID systems which is brought about by the method provided by this embodiment would be more significant.

Since the method provided by this embodiment can improve the system efficiency, it can meet the requirements of high efficiency applications.

As shown in FIG. 2a, this embodiment of the present invention provides a method for data verification, which method is particularly applicable to an RFID system. This method comprises the following steps:

Step 201: receiving, by an RFID tag, a write command.

Step 202: writing, by the RFID tag, data to be written in the write command into a local storage.

Step 203: reading out, by the RFID tag, data in the storage.

Step 204: comparing, by the RFID tag, the data read out thereby with the data to be written in the write command, and if they are the same, then it proceeds to step 205, otherwise, it proceeds to step 206.

Step 205: confirming that the writing has succeeded.

Since the comparison results in step 204 are the same, then it is deemed that the writing has succeeded, therefore, the process of data verification can be ended, and it proceeds to the subsequent procedures.

Step 206: confirming that the writing has failed.

After having confirmed that the writing has failed, the data to be written in the write command can be written again by the RFID tag, and it continues to carry out the data verification.

Furthermore, the RFID tag can also inform the reader that the writing has failed. Furthermore, in order to save processing time, the RFID tag can also inform the reader that the writing has succeeded. Furthermore, in the case that the writing has failed, the RFID tag can re-write the data to be written in the write command into the local storage. The re-writing operation can be carried out immediately after it is confirmed that the writing has failed or it can be carried out after a command is received from the reader. In this embodiment, both the feedback after step 206 and the re-writing step can be applicable to the embodiment shown in FIG. 2b, and this will not be described redundantly hereinbelow.

In this embodiment, the RFID tag can set only one cache for storing a write command, or it can set a cache for storing a write command and at the same time also set a cache for storing the data to be written in the write command.

When setting only one cache for storing the write command, it is unnecessary to increase the cache of the RFID tag, however, when step 204 is carried out, data must be extracted from the write command again to carry out a comparison, and the implementation of this process is relatively complicated, but change to the RFID setting can be avoided and consumption of the RFID tag storage can be reduced.

If another cache is set for storing the data to be written in the write command, then, when step 204 is carried out, comparison of corresponding bits in the hardware can be directly carried out, thus the implementation of the comparison process is relatively simple and quicker, and the error rate is also lower; however, it is required to set an additional cache and to change the settings of the RFID tag.

By way of the method provided by this embodiment, the data verification can be carried out by the RFID tag, which avoids additional transmission time and at the same time can also avoid reduction of system efficiency caused by transmission errors, thus the efficiency of the RFID system can be improved and it can be applicable to high efficiency applications.

As shown in FIG. 2b, this embodiment of the present invention provides a method for data verification, which method is particularly applicable to an RFID system. This method comprises the following steps:

Step 210: receiving, by an RFID tag, a write command.

Step 220: writing, by the RFID tag, data to be written in the write command into a local storage.

Step 230: reading out, by the RFID tag, data in the storage.

Step 240: replacing, by the RFID tag, the data to be written in the write command with the data read out thereby to form a new write command.

Step 250: performing reception verification, by the RFID tag, to the new write command, if the verification is passed, then step 260 is entered, and if the verification is not passed, then step 270 is entered.

In this step, the method of reception verifying can be various methods (such as a cyclic redundancy check (CRC)) for verifying the received data.

Step 260: confirming that the writing has succeeded.

Step 270: confirming that the writing has failed.

In this embodiment, after step 270, feedback that the writing has failed or the writing has succeeded can also be provided to the reader by a reception feedback message. This reception feedback message is a message for feeding back whether the reception has succeeded.

In this embodiment, it is not necessary to perform a comparison, instead the data in the write command is replaced with the data read out and then the write command is verified, thus it is not necessary to add to the cache or to perform a comparison, and it is not necessary to change the settings of the RFID; the implementation of reception verification is also relatively easy, and at the same time the system efficiency can be improved. Moreover, writing failure or writing success can be fed back using a reception feedback message, which reduces signaling overheads.

The above examples can refer to one another, and the steps of the methods disclosed by the embodiments can be implemented by the way of software, hardware or the combination thereof.

As shown in FIG. 3a, this embodiment of the present invention provides an apparatus for data verification. This apparatus comprises: a receiving module 301 for receiving a write command; a writing module 302 for writing data to be written in the write command into a first storage module 303; a first storage module 303 for storing the data to be written; a reading module 304 for reading data from the first storage module 303; and a verifying module 305 for carrying out a verification according to the data read out by the reading module 304.

In this embodiment, there can be various particular ways of implementing the verifying module 305. For example, the verifying module 305 can be particularly used for comparing the data to be written in the write command with the data which is read out by the reading module 304, and if they are the same, then it is confirmed that the writing has succeeded, otherwise, it is confirmed that the writing has failed.

Figure 3B:
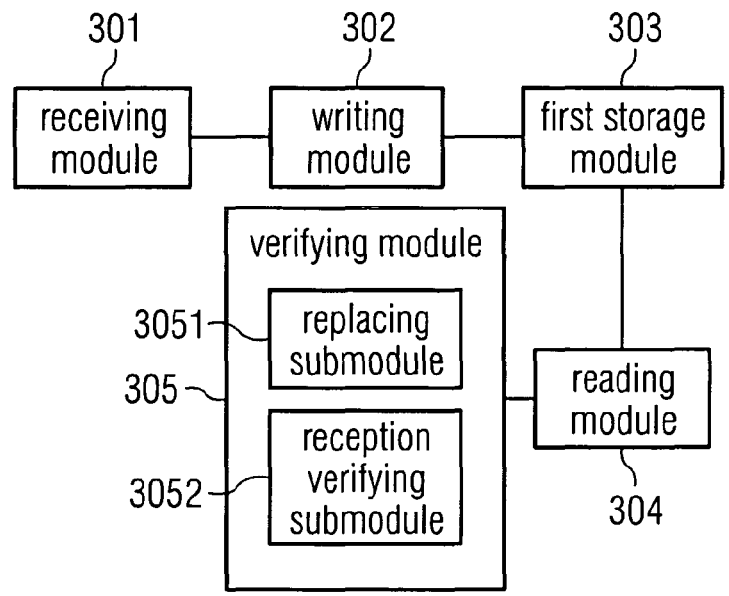
FIG. 3b is a schematic structural diagram of an apparatus for data verification provided by the embodiments of the present invention.
Figure 3C:
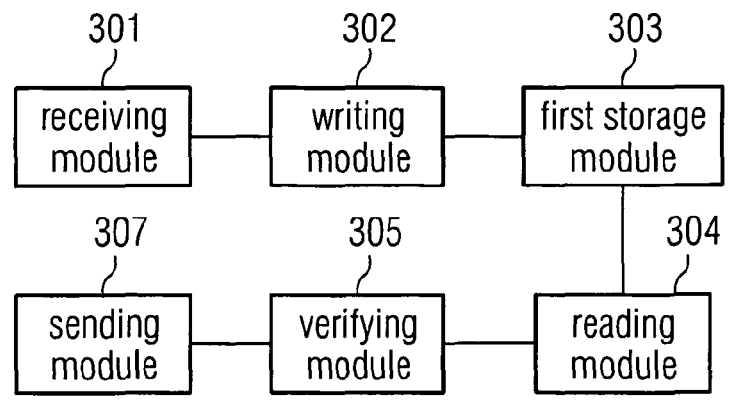
FIG. 3c is a schematic structural diagram of an apparatus for data verification provided by the embodiments of the present invention.
Figure 3D:
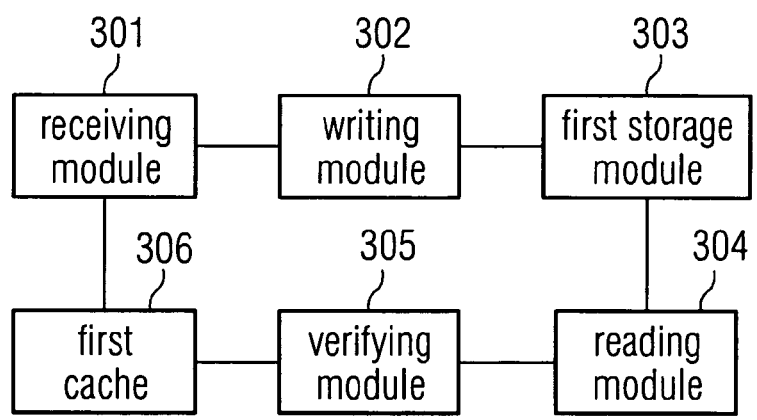
FIG. 3d is a schematic structural diagram of an apparatus for data verification provided by the embodiments of the present invention.

As shown in FIG. 3d, at this moment, this apparatus for data verification, for example, can further comprise a first cache 306 for temporarily storing the data to be written in the write command; accordingly, the verifying module 305 can compare the data of the first cache 306 with the data read out by the reading module 304.

Alternatively, the verifying module 305 can extract the data to be written from the write command and use the same for comparison with the data which is read out by the reading module 304.

As shown in FIG. 3b, the verifying module 305 can further comprise: a replacing submodule 3051 for replacing the data to be written in the write command with the data which is read out by the reading module 304 to form a new write command; and a reception verifying submodule 3052 for performing a reception verification on the new write command. This reception verification can include various methods (such as CRC) for verifying whether the received data is correct.

Furthermore, as shown in FIG. 3c, this apparatus for data verification, for example, can further comprise a sending module 307 for feeding back that the writing has failed and/or that the writing has succeeded. Furthermore, the sending module 307, for example, can feedback that the writing has failed or that the writing has succeeded by a reception feedback message, thus signaling overheads can be reduced.

By way of the apparatus for data verification provided by this embodiment, the data verification can be completed by this apparatus, thus the transmission time is saved and at the same time reduction of the system efficiency caused by transmission errors can also be avoided. Accordingly, this apparatus is suitable for high efficiency applications.

The apparatus for data verification as shown in FIGS. 3a, 3b, 3c, and 3d can be provided in an RFID tag, which RFID tag can carry out data verification by itself, and it is not necessary to send the data to be verified to a reader, therefore, additional transmission time is saved, errors caused by transmission are avoided, unnecessary re-writing processes are reduced, the efficiency of the RFID system can be improved, and it also can be used in high efficiency applications.

The apparatus for data verification provided by the above embodiments and an RFID tag including this apparatus for data verification, for example, can carry out the above method embodiments.

Figure 4:
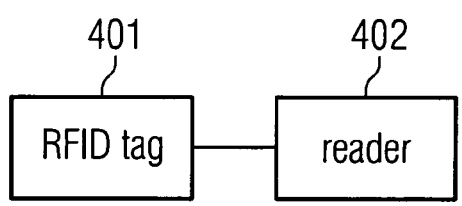
FIG. 4 is a schematic structural diagram of a system for data verification provided by the embodiments of the present invention.

As shown in FIG. 4, this embodiment of the present invention further provides a system for data verification, which system comprises an RFID tag 401 and a reader 402.

In this case, the RFID tag 401 comprises an apparatus for data verification as shown in FIGS. 3a, 3b, and 3c. This reader 402 is used for sending a write command to the RFID tag 401. This reader 402 can further receive feedback that the writing has failed and/or that the writing has succeeded, from the RFID tag 401.

should be appreciated by those skilled in the art that, various variations and modifications can be made to each of the embodiments of the present invention without departing from the spirit of the present invention, and all these variations and modifications should fall into the protection scope of the present invention. Therefore, the protection scope of the present invention is to be defined by the appended claims.

What is claimed is:

1. A method for verifying a successful radio frequency identification (RFID) reader command to an RFID tag, the method, comprising:
    receiving a plurality of RFID reader's write commands from at least one RFID reader during a normal operational mode of the RFID tag;
    for each RFID reader's write command received at the RFID tag from a respective RFID reader:
        identifying, by the RFID tag, data to be written of the RFID reader's write command;
        storing the data to be written in cache memory of the RFID tag;
        writing, via said RFID tag, the data to be written of the RFID reader's write command into a local storage of the RFID tag, while maintaining the data to be written in the cache memory of the RFID tag;
        reading, via said RFID tag, the written data to be written of the RFID reader's write command from the local storage of the RFID tag; and
        verifying, via said RFID tag, that the data to be written of the RFID reader's write command was accurately written into the local storage of the RFID tag by comparing (a) the data read from the local storage of the RFID tag with (b) the data to be written stored in the cache memory of the RFID tag to determine whether the compared data is the same.

2. The method of claim 1, further comprising:
    if the compared data are determined to be the same, confirming that the writing has succeeded, and
    if the compared data are determined to not be the same, confirming that the writing has failed.

3. The method of claim 1, wherein said RFID tag carrying out the data verification according to said data read out thereby comprises:
    said RFID tag replacing the data to be written in said write command by said data read out thereby, to form a new write command; and
    said RFID tag performing verification of said new write command, and
    if it passes the verification, confirming that the writing has succeeded, and
    if it does not pass the verification, confirming that the writing has failed.

4. The method of claim 3, wherein said RFID tag carrying out the verification of said new write command comprises said RFID tag carrying out a cyclic redundancy check on said new write command.

5. The method of claim 1, further comprising one or any combination of the following:
    said RFID tag feeding back a writing failure in response to confirming that the writing has failed;
    said RFID tag feeding back a writing success in response to confirming that the writing has succeeded; and
    said RFID tag writing again the data to be written in said write command into the local storage in response to confirming that the writing has failed.

6. The method of claim 5, wherein the feeding back by said RFID tag of the writing failure comprises: said RFID tag feeding back the writing failure by a reception feedback message indicating whether the reception has succeeded.

7. The method of claim 1, wherein the cache memory of the RFID tag and local storage of the RFID tag comprise distinct memory units.

8. The method of claim 1, wherein the cache memory of the RFID tag and local storage of the RFID tag comprise different portions of the same memory unit.

9. The method of claim 1, comprising:
    receiving the RFID reader's write command at the RFID tag;
    storing the RFID reader's write command including the data to be written of the RFID reader's write command in a first cache memory; and
    storing the data to be written of the RFID reader's write command in a second cache memory.

10. A radio frequency identification (RFID) tag for verifying a successful RFID reader command, the RFID tag comprising:
    a receiving module configured to receive a plurality of RFID reader's write commands from at least one RFID reader during a normal operational mode of the RFID tag, and for each received RFID reader's write command received from a respective RFID reader, identify data to be written of the respective write command from the respective RFID reader;
    cache memory configured to store the respective write command, including the data to be written;
    a first storage module configured to store the data to be written;
    a writing module configured to write the data to be written into the first storage module, while the data to be written is maintained in the cache memory;
    a reading module configured to read written data from said first storage module; and
    a verifying module configured to verify the accuracy of data written into the first storage module by comparing the data read out by said reading module with (b) the data to be written received from the respective RFID reader and stored in the cache memory of the RFID tag to determine whether the compared data is the same.

11. The RFID tag of claim 10, wherein if the compared data are the same, said verifying module is configured to confirm that the writing has succeeded, and
if the compared data are not the same, said verifying module is configured to confirm that the writing has failed.

12. The RFID tag of claim 10, wherein said verifying module comprises:
a replacing submodule configured to replace the data to be written in said write command with the data read out by said reading module, to form a new write command; and
a reception verifying submodule configured to perform a reception verification on said new write command.

13. The RFID tag of claim 12, wherein said reception verifying submodule is configured to perform a cyclic redundancy check on said new write command.

14. A radio frequency identification (RFID) tag for verifying a successful RFID reader command, the RFID tag comprising:
a data verification apparatus comprising:
a receiving module configured to receive a plurality of RFID reader's write commands from at least one RFID reader during a normal operational mode of the RFID tag, and for each received RFID reader's write command received from a respective RFID reader, identify data to be written of the respective write command from the respective RFID reader;
cache memory configured to store the respective write command, including the data to be written;
a storage module configured to store said data to be written;
a writing module configured to write said data to be written into the first storage module, while the data to be written is maintained in the cache memory;
a reading module configured to read data from said first storage module; and
a verifying module configured to verify the accuracy of data written into the first storage module by comparing the data read out by said reading module with (b) the data to be written received from the respective RFID reader and stored in the cache memory of the RFID tag to determine whether the compared data is the same.

15. The RFID tag of claim 14, wherein if the compared data is the same, said verifying module is configured to confirm that the writing has succeeded, and otherwise to confirm that the writing has failed.

16. The RFID tag of claim 14, wherein said verifying module comprises:
a replacing submodule configured to replace the data to be written in said write command with the data read out by said reading module, to form a new write command; and
a reception verifying submodule configured to perform a reception verification on said new write command.

17. The RFID tag of claim 16, wherein said reception verifying submodule is configured to perform a cyclic redundancy check on said new write command.

* * * * *